(12) United States Patent
Favicchio et al.

(10) Patent No.: US 10,880,614 B2
(45) Date of Patent: Dec. 29, 2020

(54) INTEGRATED INTELLIGENT OVERLAY FOR MEDIA CONTENT STREAMS

(71) Applicant: FMR LLC, Boston, MA (US)

(72) Inventors: David Favicchio, Boston, MA (US); Christopher Lackey, Boston, MA (US); Veronica Grigoras, Boston, MA (US); Philipp Hanes, Boston, MA (US); Byung Chun, Boston, MA (US); Chad Iverson, Boston, MA (US)

(73) Assignee: FMR LLC, Boston, MA (US)

( * ) Notice: Subject to any disclaimer, the term of this patent is extended or adjusted under 35 U.S.C. 154(b) by 28 days.

(21) Appl. No.: 16/164,162

(22) Filed: Oct. 18, 2018

(65) Prior Publication Data

US 2019/0124403 A1 Apr. 25, 2019

Related U.S. Application Data

(60) Provisional application No. 62/575,078, filed on Oct. 20, 2017.

(51) Int. Cl.
| | | |
|---|---|---|
| *H04N 21/488* | (2011.01) | |
| *H04N 21/44* | (2011.01) | |
| *H04N 21/466* | (2011.01) | |
| *H04N 21/431* | (2011.01) | |
| *H04N 21/45* | (2011.01) | |

(Continued)

(52) U.S. Cl.
CPC ....... *H04N 21/4884* (2013.01); *H04N 21/233* (2013.01); *H04N 21/23418* (2013.01); *H04N 21/252* (2013.01); *H04N 21/25866* (2013.01); *H04N 21/2668* (2013.01); *H04N 21/431* (2013.01); *H04N 21/44* (2013.01); *H04N 21/4532* (2013.01); *H04N 21/466* (2013.01); *H04N 21/8405* (2013.01); *H04N 21/854* (2013.01); *H04N 21/2187* (2013.01)

(58) Field of Classification Search
None
See application file for complete search history.

(56) References Cited

U.S. PATENT DOCUMENTS

| | | | |
|---|---|---|---|
| 8,087,044 B2 | 12/2011 | Krause et al. | |
| 8,924,338 B1 * | 12/2014 | Sheng | G06F 16/1873 706/52 |

(Continued)

*Primary Examiner* — Nasser M Goodarzi
*Assistant Examiner* — Terrika Peterson
(74) *Attorney, Agent, or Firm* — Proskauer Rose LLP (57) ABSTRACT

Methods and systems are described for generating integrated intelligent content overlays for media content streams. A server computing device receives a video content stream from a video data source. The server extracts a corpus of machine-recognizable text from the video content stream, the corpus of machine-recognizable text corresponding to at least one of audio or closed captioning text associated with the video content stream. The server identifies one or more entity names contained in the corpus of machine-recognizable text. The server determines a set of content keywords associated with each of the identified entity names. The server generates a content overlay for the video content stream comprising one or more layers that include graphical content relating to at least one of the sets of content keywords. The server integrates the content overlay into the video content stream to generate a customized video content stream.

26 Claims, 6 Drawing Sheets

(51) Int. Cl.
*H04N 21/854* (2011.01)
*H04N 21/233* (2011.01)
*H04N 21/2668* (2011.01)
*H04N 21/234* (2011.01)
*H04N 21/25* (2011.01)
*H04N 21/8405* (2011.01)
*H04N 21/258* (2011.01)
*H04N 21/2187* (2011.01)

(56) References Cited

U.S. PATENT DOCUMENTS

| | | |
|---|---|---|
| 9,414,130 B2 | 8/2016 | Coan et al. |
| 9,652,444 B2 | 5/2017 | El-Saban et al. |
| 2009/0235312 A1* | 9/2009 | Morad .................. G06Q 30/02 |
| | | 725/44 |
| 2010/0049605 A1* | 2/2010 | Kim ....................... G06Q 30/02 |
| | | 705/14.52 |
| 2013/0346144 A1* | 12/2013 | Ferren ................. G06K 9/3266 |
| | | 705/7.29 |
| 2013/0347018 A1 | 12/2013 | Limp et al. |
| 2014/0111542 A1* | 4/2014 | Wan ........................ G06F 3/147 |
| | | 345/633 |
| 2014/0344854 A1 | 11/2014 | Kanojia et al. |
| 2014/0359656 A1* | 12/2014 | Banica ................. H04N 21/812 |
| | | 725/32 |
| 2016/0019239 A1* | 1/2016 | Bastaldo-Tsampalis ..................... |
| | | G06F 16/5838 |
| | | 345/632 |
| 2016/0171283 A1* | 6/2016 | Masood ................ G06F 16/738 |
| | | 382/103 |
| 2016/0173812 A1* | 6/2016 | Suh .................... H04N 21/4622 |
| | | 725/32 |
| 2018/0232443 A1* | 8/2018 | Delgo .................. G06F 17/278 |
| 2018/0288494 A1* | 10/2018 | Grover ............... G06K 9/00744 |

* cited by examiner

INTEGRATED INTELLIGENT OVERLAY FOR MEDIA CONTENT STREAMS

RELATED APPLICATIONS

This application claims priority to U.S. Provisional Patent Application No. 62/575,078, filed on Oct. 20, 2017, the entirety of which is incorporated herein by reference.

TECHNICAL FIELD

This application relates generally to methods and apparatuses, including computer program products, for generating integrated intelligent overlays for media content streams, including but not limited to systems and methods for actively learning from a live content stream and overlaying on the content stream (in real-time or near real-time) self-adapting and extendable enrichment/enhancements based on the learned content.

BACKGROUND

Over the past few years, the consumption of video content has changed significantly. In the past, consumers would watch broadcast television delivered over the airwaves, which had almost no capability for customization of the broadcast stream to the individual end users. Now, users can watch an enormous variety of different digital programming that is typically delivered from a server computing device to the end user's computing device via an individual video content stream. For example, a user can launch an app on his or her smartphone and instantly stream any one of thousands of movies, television shows, live news or sports broadcasts, and so forth.

However, this type of video content streaming is typically not customized for the individual end user watching it. For example, in order to view supplemental content about a particular video content stream, a user may have to resort to accessing a second client computing device (e.g., second screen) in order to view the primary video content stream and the customized supplemental content at the same time. Further, such supplemental content is typically not dynamic and customizable in real-time during playback of the video content, such that the supplemental content does not adapt to the video content but is provided in a static form ahead of the actual viewing of the video content.

SUMMARY

Therefore, what is needed are computerized methods and systems that overcome the above-mentioned limitations of existing video streaming technology. The methods and systems described herein provide techniques for advantageously capturing text content that corresponds to speech from a live video content stream, automatically analyzing the captured text, and generating a content overlay to be integrated with the video content stream (typically, in real-time or near real-time) that provides self-adapting and extendable enrichment/enhancements based on the text content. Generally, the live content stream can be of any video, audio or text-based content, such as video streaming of Bloomberg News™ from Apple TV™.

The invention, in one aspect, features a system for generating integrated intelligent content overlays for media content streams, the system comprising a server computing device with a memory that stores computer-executable instructions and a processor that executes the computer-executable instructions to receive a video content stream from a video data source. The server computing device extracts a corpus of machine-recognizable text from the video content stream, the corpus of machine-recognizable text corresponding to at least one of audio or closed captioning text associated with the video content stream. The server computing device identifies one or more entity names contained in the corpus of machine-recognizable text. The server computing device determines a set of content keywords associated with each of the identified entity names. The server computing device generates a content overlay for the video content stream comprising one or more layers that include graphical content relating to at least one of the sets of content keywords. The server computing device integrates the content overlay into the video content stream to generate a customized video content stream.

The invention, in another aspect, features a computerized method of generating integrated intelligent content overlays for media content streams. A server computing device receives a video content stream from a video data source. The server computing device extracts a corpus of machine-recognizable text from the video content stream, the corpus of machine-recognizable text corresponding to at least one of audio or closed captioning text associated with the video content stream. The server computing device identifies one or more entity names contained in the corpus of machine-recognizable text. The server computing device determines a set of content keywords associated with each of the identified entity names. The server computing device generates a content overlay for the video content stream comprising one or more layers that include graphical content relating to at least one of the sets of content keywords. The server computing device integrates the content overlay into the video content stream to generate a customized video content stream.

Any of the above aspects can include one or more of the following features. In some embodiments, the server computing device receives a request for the video content stream from a client computing device, identifies a user of the client computing device based upon one or more attributes of the request, retrieves a user profile based upon an identity of the user, the user profile comprising one or more user attributes, and adjusts the graphical content included in the layers of the content overlay based upon the user profile. In some embodiments, extracting a corpus of machine-recognizable text from the video content stream comprises capturing an audio stream associated with the video content stream, the audio stream comprising a digital waveform corresponding to speech in the video content stream, and converting the digital waveform of the audio stream into the corpus of machine-recognizable text. In some embodiments, extracting a corpus of machine-recognizable text from the video content stream comprises capturing a closed-captioning stream associated with the video content stream, the closed-captioning stream comprising text corresponding to speech in the video content stream, and converting the text of the closed-captioning stream into the corpus of machine-recognizable text.

In some embodiments, determining a set of content keywords associated with each of the identified entity names comprises executing a trained word embedding model using as input the identified entity names, the trained word embedding model comprising a multidimensional vector space, to determine one or more content keywords that are within a predetermined distance of the identified entity name within the multidimensional vector space. In some embodiments, determining a set of content keywords associated with each of the identified entity names comprises executing a trained LSTM model using as input one or more sentences from the corpus of machine-recognizable text that contain the entity names to predict whether the one or more sentences relate to the identified entity names, and generating one or more content keywords using the one or more sentences, when the one or more sentences are predicted to relate to the identified entity names.

In some embodiments, generating a content overlay for the video content stream comprises generating one or more video frames containing the one or more layers. In some embodiments, integrating the content overlay into the video content stream to generate a customized video content stream comprises inserting the one or more video frames containing the one or more layers into the video content stream to replace one or more existing video frames in the video content stream.

In some embodiments, extracting a corpus of machine-recognizable text from the video content stream further comprises mapping the corpus of machine-recognizable text to the video content stream based upon a timestamp. In some embodiments, generating a content overlay for the video content stream further comprises synchronizing the content overlay to the video stream based upon the timestamp.

In some embodiments, the server computing device transmits the customized video content stream to a client computing device for display. In some embodiments, the transmission of the customized video content stream to the client computing device is a streaming session. In some embodiments, the video content stream comprises a live video stream or a prerecorded video file.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
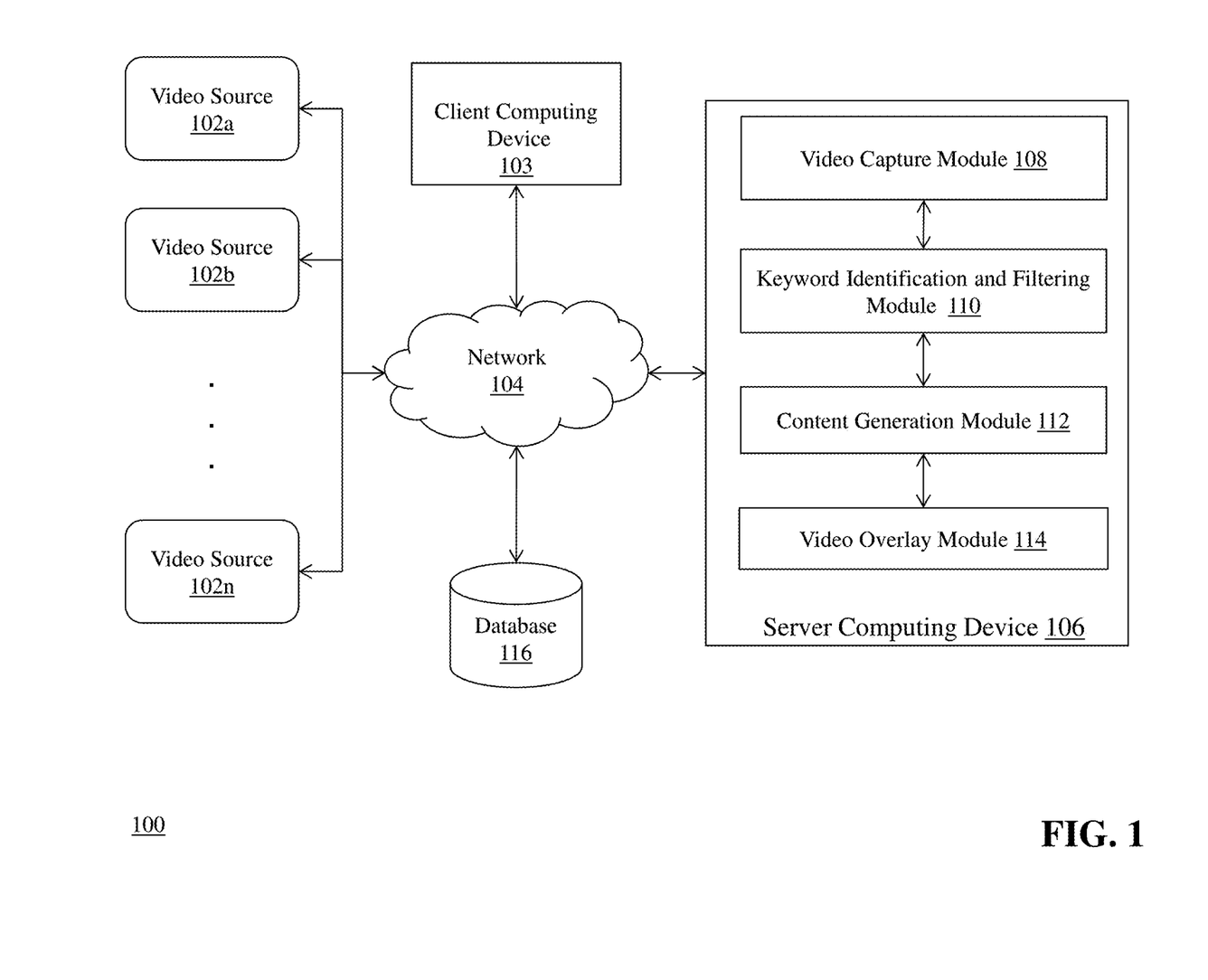
FIG. 1 is a block diagram of a system for generating integrated intelligent overlays for media content streams.

FIG. 1 is a block diagram of a system 100 for generating integrated intelligent overlays for media content streams. The system 100 includes a plurality of video data sources 102a-102n, a client computing device 103, a communications network 104, a server computing device 106 comprising a video capture module 108, a keyword identification and filtering module 110, a content generation module 112, and a video overlay module 114, and a database 116.

The video data sources 102a-102n are computing devices that connect to the communications network 104 in order to communicate with the server computing device 106 to enable the modules of server computing device 106 to receive video content data comprising raw video relating to the process of generating integrated intelligent overlays for media content streams as described herein. For example, video data sources 102a-102n can comprise live broadcast video feeds/streams, pre-recorded video feeds/streams, video files (e.g., .MP4, .MOV, .FLV, etc.). Generally, the raw video data includes corresponding audio data and/or closed-captioning text data that relates to speech that accompanies the video content. In one example, the raw video data can comprise a news report where a reporter or narrator discusses current events or topics of interest. In another example, the raw video data can comprise an interview or roundtable discussion where one or more people are speaking about a particular topic. In some embodiments, the video data sources 102a-102n push the video content streams to the server computing device 106 via communication network 104. In some embodiments, the server computing device 106 captures the video content streams from one or more of the video data sources 102a-102n (e.g., by subscribing to a feed or accessing a network address that hosts the video content).

The system 100 includes a client computing device 103 in communication with server computing device 106 for the purpose of, e.g., receiving video content streams and viewing the streams by a remote user, as is described herein. Exemplary client devices 103 include but are not limited to desktop computers, laptop computers, tablets, mobile devices, smartphones, smart televisions, streaming appliances (e.g., Apple TV™, Amazon Fire Stick®), and the like. It should be appreciated that other types of computing devices that are capable of connecting to the components of the system 100 can be used without departing from the scope of invention. Although FIG. 1 depicts a single client computing device 103, it should be appreciated that the system 100 can include any number of client devices. And as mentioned above, the client computing device 103 also includes or is coupled to a display device (e.g., monitor, LCD/LED screen) for playing back video content streams to a user of the client device.

The communication network 104 enables the other components of the system 100 to communicate with each other in order to perform the process of generating integrated intelligent overlays for media content streams as described herein. The network 104 may be a local network, such as a LAN, or a wide area network, such as the Internet and/or a cellular network. In some embodiments, the network 104 is comprised of several discrete networks and/or sub-networks (e.g., cellular to Internet) that enable the components of the system 100 to communicate with each other.

The server computing device 106 is a computing device (or in some embodiments, a set of computing devices) that comprises a combination of hardware, including one or more processors and one or more physical memory modules, and specialized software engines and models that execute on the processor of the server computing device 106, to receive data from other components of the system 100, transmit data to other components of the system 100, and perform functions for generating integrated intelligent overlays for media content streams as described herein. As mentioned above, the processor of the server computing device 106 executes a video capture module 108, a keyword identification and filtering module 110, a content generation module 112, and a video overlay module 114.

In some embodiments, the modules 108, 110, 112, and 114 are specialized sets of computer software instructions programmed onto a dedicated processor in the server computing device 106 and can include specifically-designated memory locations and/or registers for executing the specialized computer software instructions. Although the modules 108, 110, 112, and 114 are shown in FIG. 1 as executing within the same server computing device 106, in some embodiments the functionality of the modules 108, 110, 112, and 114 can be distributed among a plurality of server computing devices. As shown in FIG. 1, the server computing device 106 enables the modules 108, 110, 112, and 114 to communicate with each other in order to exchange data for the purpose of performing the described functions. It should be appreciated that any number of computing devices, arranged in a variety of architectures, resources, and configurations (e.g., cluster computing, virtual computing, cloud computing) can be used without departing from the scope of the invention. The exemplary functionality of the modules 108, 110, 112, and 114 is described in detail below.

The database 116 is a computing device (or in some embodiments, a set of computing devices) that is coupled to the server computing device 106 and is configured to receive, generate, and store specific segments of data relating to the process of generating integrated intelligent overlays for media content streams as described herein. In some embodiments, all or a portion of the database 116 can be integrated with the server computing device 106 or be located on a separate computing device or devices. For example, the database 116 can comprise one or more databases, such as MySQL™ available from Oracle Corp. of Redwood City, Calif.

Figure 2:
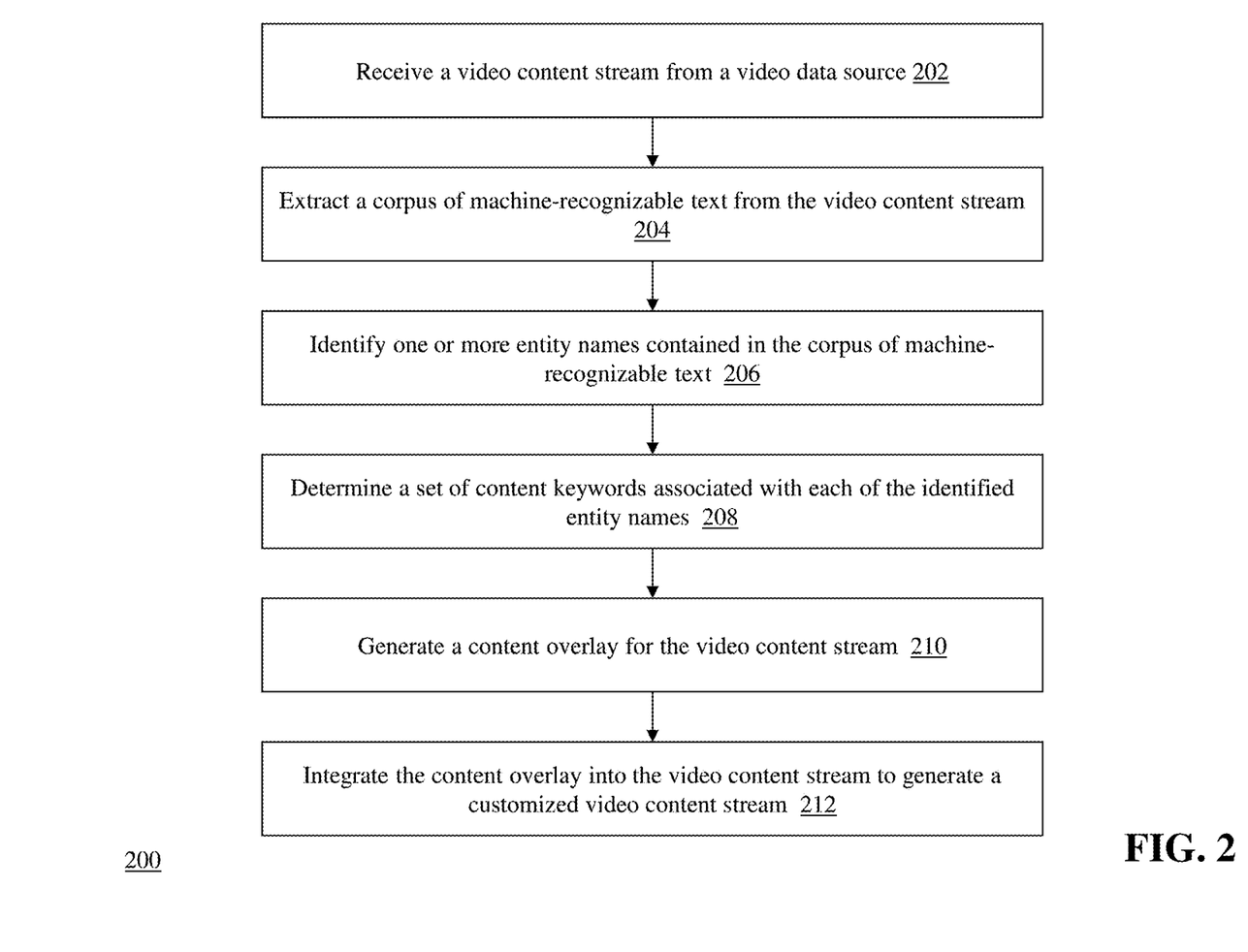
FIG. 2 is a flow diagram of a computerized method of generating integrated intelligent overlays for media content streams.

FIG. 2 is a flow diagram of a computerized method 200 of generating integrated intelligent overlays for media content streams, using the system 100 of FIG. 1. The video capture module 108 of server computing device 106 receives (202) a video content stream from a video data source (e.g., data sources 102a-102n). As mentioned above, the video capture module 108 can receive live broadcast video feeds/streams, pre-recorded video feeds/streams, video files, and the like. In one embodiment, the video capture module 108 establishes a network connection with one or more of the video data sources 102a-102n, and receives one or more packetized bitstreams containing the video content from the video data sources.

In some embodiments, the video capture module 108 further receives a separate audio stream that is associated with the video content stream and/or the module 108 receives a closed-captioning text stream or file that is associated with the video content stream. It should be appreciated that the audio stream and/or closed-captioning text can be packaged with the video content into a single bitstream or file streaming session. As mentioned above, the audio stream can comprise a bitstream that contains audio data corresponding to speech uttered by one or more persons depicted in (or otherwise associated with) the video content stream. Similarly, the closed-captioning text data can comprise alphanumeric text corresponding to speech uttered by persons in the video content stream. Also, it should be appreciated that, in some embodiments, the video content stream can comprise metadata that describes one or more characteristics of the video content stream, such as timestamp data (e.g., start time, end time, intermediate timestamps, etc.), bitrate/compression, frame rate, display resolution, stream ID number, sequence ID number, and so forth. The video capture module 108 can receive the above-referenced data as incorporated into, or in conjunction with receiving, video content streams from the video data sources 102a-102n.

The video capture module 108 extracts (204) a corpus of machine-recognizable text from the video content stream received from the video data sources 102a-102n. For example, in the case of an audio stream that is incorporated into or accompanies a video content stream, the video capture module 108 can extract the audio portion of the video content stream and analyze the waveform using, e.g., a speech recognition or speech-to-text processing engine to convert the waveform into the corpus of machine-recognizable text from the video content stream. Exemplary speech recognition engines can include Google Cloud Speech-to-Text™ API, or Microsoft Azure Speech to Text™ API. In some embodiments, the corpus of machine-recognizable text comprises a data file (e.g., .TXT, .XML) containing words, sentences, and punctuation corresponding to the speech as transcribed from the audio data extracted by the video capture module 108.

In the case of the audio content comprising a closed-captioning text stream, the video capture module 108 can extract the closed-captioning text from the video content stream and convert the closed-captioning text into the corpus of machine-recognizable text. For example, in some embodiments, the video capture module 108 can parse the closed-captioning text to identify certain speakers (e.g., a narrator, a reporter, an interviewee, etc.) and extract the closed-captioning text for those speakers into the corpus of machine-recognizable text. In some embodiments, the video capture module 108 can extract the entire set of closed-captioning text and store the set of text as the corpus of machine-recognizable text (e.g., a data file). In some embodiments, the video capture module 108 stores the corpus of machine-recognizable text in the database 116.

In addition, during processing of the video content stream, the video capture module 108 can capture the metadata associated with the video content stream and store the metadata in the database 116. In some embodiments, the video capture module 108 can annotate the machine-recognizable text based upon the metadata—e.g., associate one or more timestamps in the metadata with portions of the machine-recognizable text.

Once the video capture module 108 has generated the corpus of machine-recognizable text, the module 108 transmits the corpus of machine-recognizable text to the keyword identification and filtering module 110, which processes the corpus of text in order to identify certain entities (e.g., company names, product names, etc.) and generate one or more sets of keywords associated with the identified entities.

Figure 3:
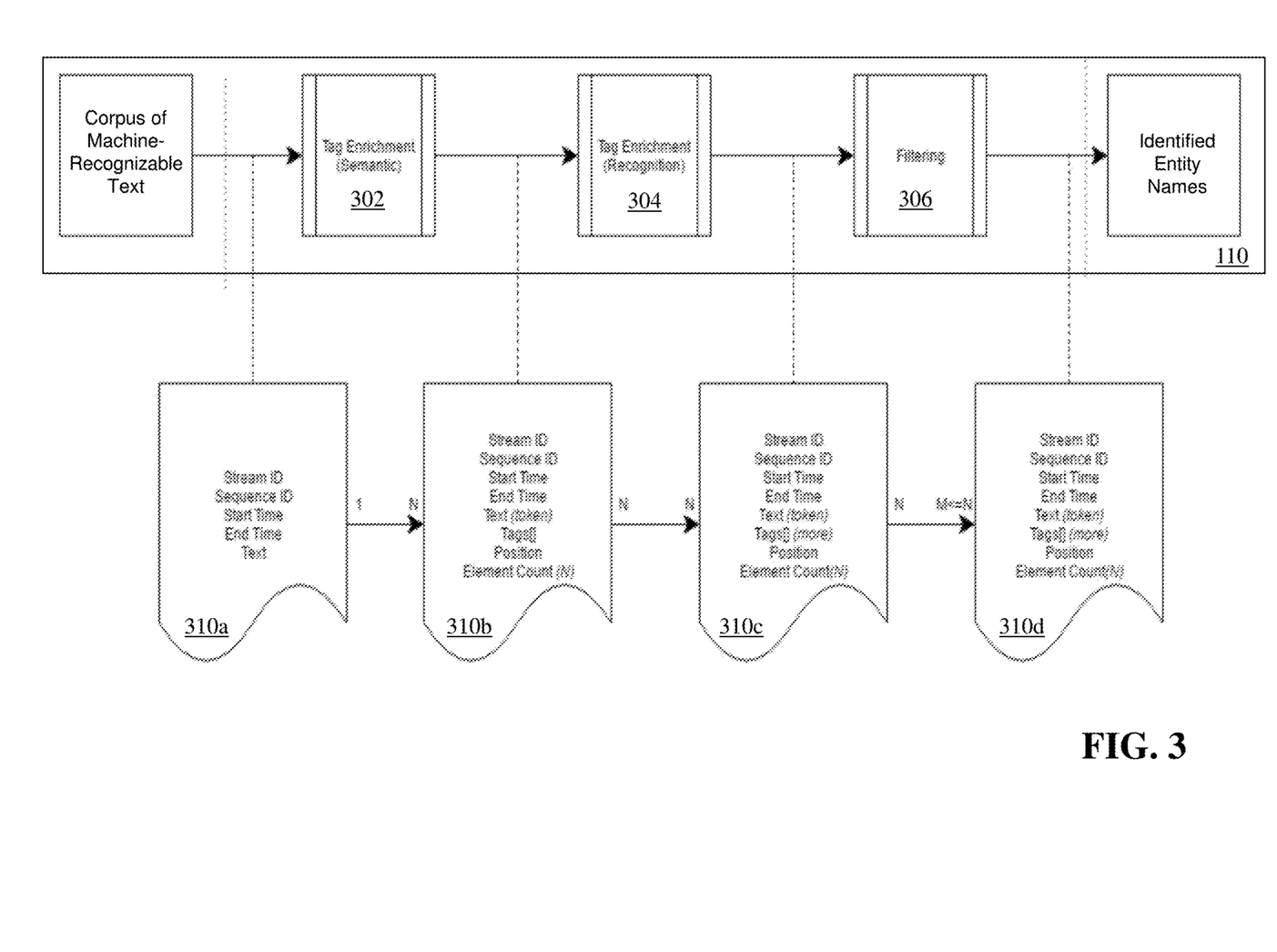
FIG. 3 is an exemplary workflow of a method for identifying entity names contained in the corpus of machine-recognizable text.

The keyword identification and filtering module 110 first identifies (206) one or more entity names contained in the corpus of machine-recognizable text. FIG. 3 is an exemplary workflow of a method for identifying entity names contained in the corpus of machine-recognizable text, executed by the keyword identification and filtering module 110. As shown in FIG. 3, a message 310a is generated that contains the corpus of machine-recognizable text, certain video-related metadata such as Stream ID, Sequence ID, Start Time, and End Time, and the message 310a is processed by the keyword identification and filtering module 110 to tag the text based upon semantics (step 302), tag the text based upon recognition of words/phrases (step 304), and filtering (step 306), to generate identified entity names in the corpus of machine-recognizable text.

In one embodiment, the step of tagging the text based upon semantics (step 302) comprises tokenizing the corpus of machine-recognizable text into a plurality of text fragments (e.g., words, phrases, punctuation symbols, whitespace) and tagging each token with an identifier relating to the token's part of speech, if applicable. An exemplary semantic processor used by the keyword identification and filtering module 110 is spaCy, a Python-based natural language processing (NLP) software module (available at https://spacy.io), and exemplary semantic tags (available at https://cs.nyu.edu/grishman/jet/guide/PennPOS.html) include:

| 1. | CC | Coordinating conjunction |
|---|---|---|
| 2. | CD | Cardinal number |
| 3. | DT | Determiner |
| 4. | EX | Existential there |
| 5. | FW | Foreign word |
| 6. | IN | Preposition or subordinating conjunction |
| 7. | JJ | Adjective |
| 8. | JJR | Adjective, comparative |
| 9. | JJS | Adjective, superlative |
| 10. | LS | List item marker |
| 11. | MD | Modal |
| 12. | NN | Noun, singular or mass |
| 13. | NNS | Noun, plural |
| 14. | NNP | Proper noun, singular |
| 15. | NNPS | Proper noun, plural |
| 16. | PDT | Predeterminer |
| 17. | POS | Possessive ending |
| 18. | PRP | Personal pronoun |
| 19. | PRP$ | Possessive pronoun |
| 20. | RB | Adverb |
| 21. | RBR | Adverb, comparative |
| 22. | RBS | Adverb, superlative |
| 23. | RP | Particle |
| 24. | SYM | Symbol |
| 25. | TO | to |
| 26. | UH | Interjection |
| 27. | VB | Verb, base form |
| 28. | VBD | Verb, past tense |
| 29. | VBG | Verb, gerund or present participle |
| 30. | VBN | Verb, past participle |
| 31. | VBP | Verb, non-3rd person singular present |
| 32. | VBZ | Verb, 3rd person singular present |
| 33. | WDT | Wh-determiner |
| 34. | WP | Wh-pronoun |
| 35. | WP$ | Possessive wh-pronoun |
| 36. | WRB | Wh-adverb |

Figure 4:
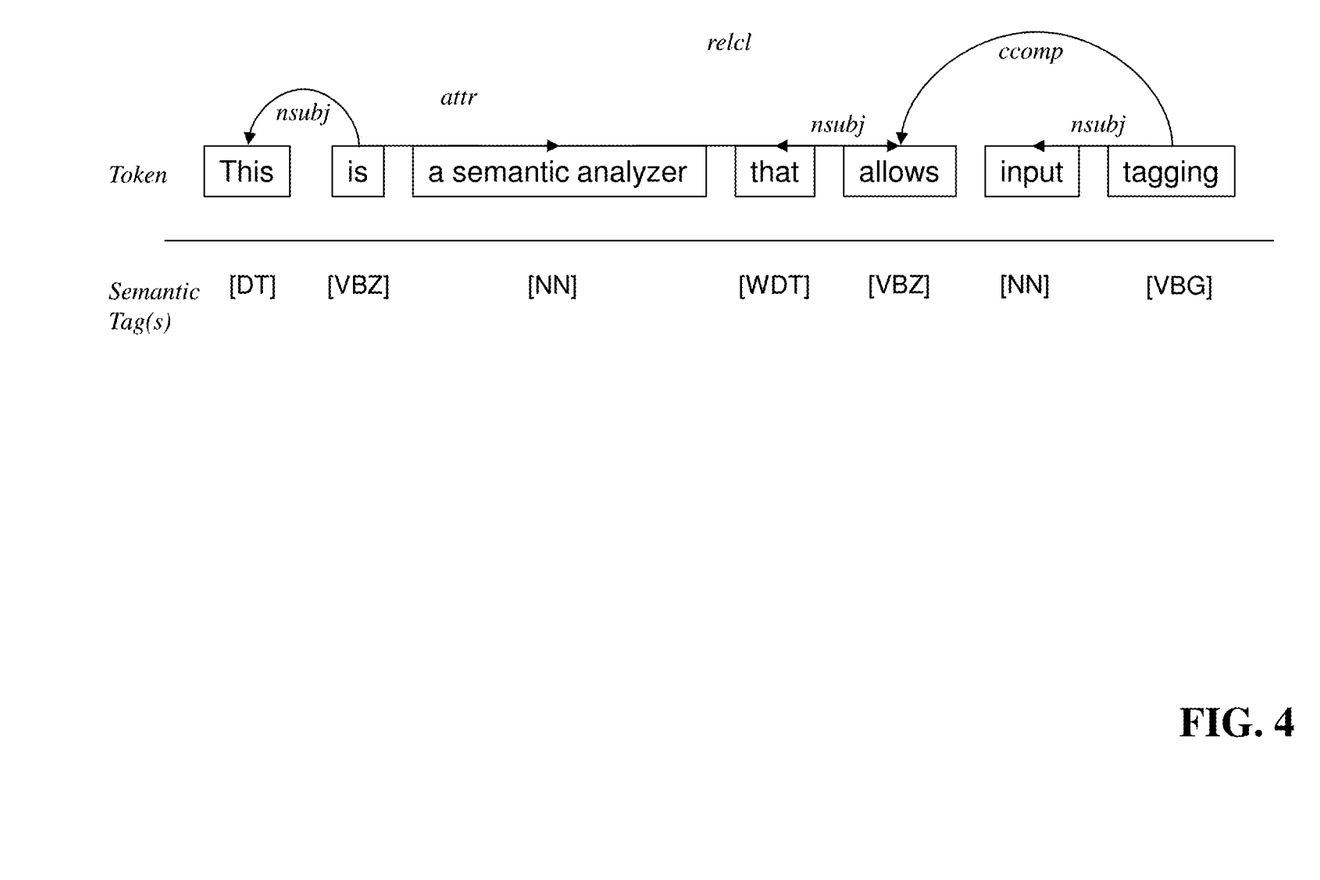
FIG. 4 is a diagram of an exemplary corpus of text that is tagged based upon semantics.

FIG. 4 is a diagram of an exemplary corpus of text that is tagged based upon semantics. As shown in FIG. 4, each word or phrase in the sentence ("This is a semantic analyzer that allows input tagging") is tagged with a part-of-speech identifier (e.g., "This"=DT [determiner]; "a semantic analyzer"=NN [noun, singular or mass], etc.). In some embodiments, relationships between certain words are also identified and mapped (e.g., as shown by the circular arrows connecting words).

Upon tokenization, each token extracted from the corpus of machine-recognizable text comprises a separate message (e.g., message 310b in FIG. 3) for further processing. The keyword identification and filtering module 110 takes the message 310a from the input step and further stores in each message 310b (i) a total number of tokens extracted from the corpus of machine-recognizable text (or fragment of machine-recognizable text) ("Element Count") as well as each token's position in the original corpus ("Position").

Next, turning back to FIG. 2, the keyword identification and filtering module 110 determines (208) a set of content keywords associated with each of the identified entity names. As shown in FIG. 3, once the tokens are tagged with semantic tags, the keyword identification and filtering module 110 processes each message 310b generated by the semantic tagging step 302 through a text recognition process (step 304) to recognize words/phrases in the text and tag the tokens based upon the recognized words/phrases. In one embodiment, the keyword identification and filtering module 110 can select the tokens that correspond to nouns and match the tokens against a mapping table or database of preselected entity names to determine which tokens correspond to identified entities. For example, if the token contains the name 'IBM,' the keyword identification and filtering module 110 can search for 'IBM' in a mapping table to return certain keywords or concepts associated with IBM (e.g., stock ticker symbol, stock price, company sector, etc.). The keyword identification and filtering module 110 can then store the keywords in the corresponding message 310c for the token.

In another embodiment, the keyword identification and filtering module 110 can execute a trained word embedding model (e.g., word2vec) using the tokens as input to determine keywords associated with the token. The word embedding model can be a multidimensional vector space comprising a plurality of nodes that are connected via a distance function. The keyword identification and filtering module 110 can execute the word embedding model to locate the token in the multidimensional vector space and then determine one or more keywords that are within a predetermined distance from the location of the token. For example, if the token is 'IBM', the keyword identification and filtering module 110 can determine that certain attributes of IBM (e.g., stock price, stock ticker symbol, market cap) are close to the location of IBM in the vector space. In another example, the keyword identification and filtering module 110 can determine that similar entities to IBM (e.g., other tech companies) are close to the location of IBM in the vector space, and retrieve attributes associated with those companies.

Next, the keyword identification and filtering module 110 can filter the tokens (step 306) of the identified entities to determine which tokens are relevant for the purposes of generating the content overlay. In one embodiment, the keyword identification and filtering module 110 decides based upon the tags associated with a token whether or not the token should be passed to the content generation module 112. For example, the keyword identification and filtering module 110 can execute a trained long short-term memory (LSTM)-based machine learning model in order to classify a sentence in the corpus of machine-recognizable text that contains the token as either relating to the identified entity or not relating to the identified entity. If the LSTM-based model determines that the sentence does not relate to the identified entity, then the keyword identification and filtering module 110 can remove the token so that it is not passed to the content generation module 112. In another example, the keyword identification and filtering module 110 can compare the identified entity names against a user profile for a user that requested the video content stream. The user profile can contain information about the user, as well as information about user preferences (e.g., a list of company names about which the user wants to see information, or a list of company names that is part of the user's investment portfolio). If the identified entity names do not match the user profile, the keyword identification and filtering module 110 can remove the associated tokens and not pass them to the content generation module 112.

Turning back to FIG. 2, the content generation module 112 receives the set of tokens containing the identified entity names and related metadata from the keyword identification and filtering module 110. The content generation module 112 generates (210) a content overlay for the video content stream. In one embodiment, the content generation module 112 retrieves one or more data items from database 116 that are associated with the identified entity names and/or the keywords. For example, the content generation module 112 can generate visual content (e.g., text, graphics, images, charts, etc.) that is placed in one or more layers on top of the existing video content stream to generate a customized video content stream. It should be appreciated that the content overlay can comprise many different types of content, including but not limited to:

Market Data
- 52 week high;
- 52 week low;
- Market cap;
- EPS;
- Last dividend;
- Equity summary score;
- Sector data;
- Proactive comparison (e.g., Amazon retail vs. Walmart retail);
- Social sentiment/social mentions Comparison Data
- One company's stock quote vs. another company's stock quote;
- One company's stock quote vs. a benchmark;
- One currency vs. another currency;
- Comparison of products of respective companies;

Contextual/Conditional Data:
- Earnings call data/date;
- Product mentions—what is it? Market share? Profit margin? Sales numbers?
- Key people—name, role;
- Key headlines;

Educational Data:
- Term identification and definition;
- Why the term is important;

User-Specific Data:
- Portfolio status;
- Goals;
- Risk tolerance;
- Persona.

Once the content overlay is generated, the content generation module 112 transmits the content overlay to the video overlay module 114, which integrates (212) the content overlay into the video content stream to generate a customized video content stream. Generally, it should be appreciated that traditional video compression techniques operate using the concept of 'frames.' For example, a video content stream is usually divided up into raw, uncompressed frames, which are then compressed using an algorithm to identify and eliminate many of the redundant data between frames. The resulting compressed frame is then classified as a specific type of frame. For example, the MPEG compression protocol uses intra-coded frames (I-frame), predictive-coded frames (P-frames), and bidirectionally-predictive-coded frames (B-frames). When a media player or other client computing device receives the compressed video content, the device applies the reverse algorithm to restore each frame to substantially the same as the corresponding raw frame in order to display the content.

Figure 5A:
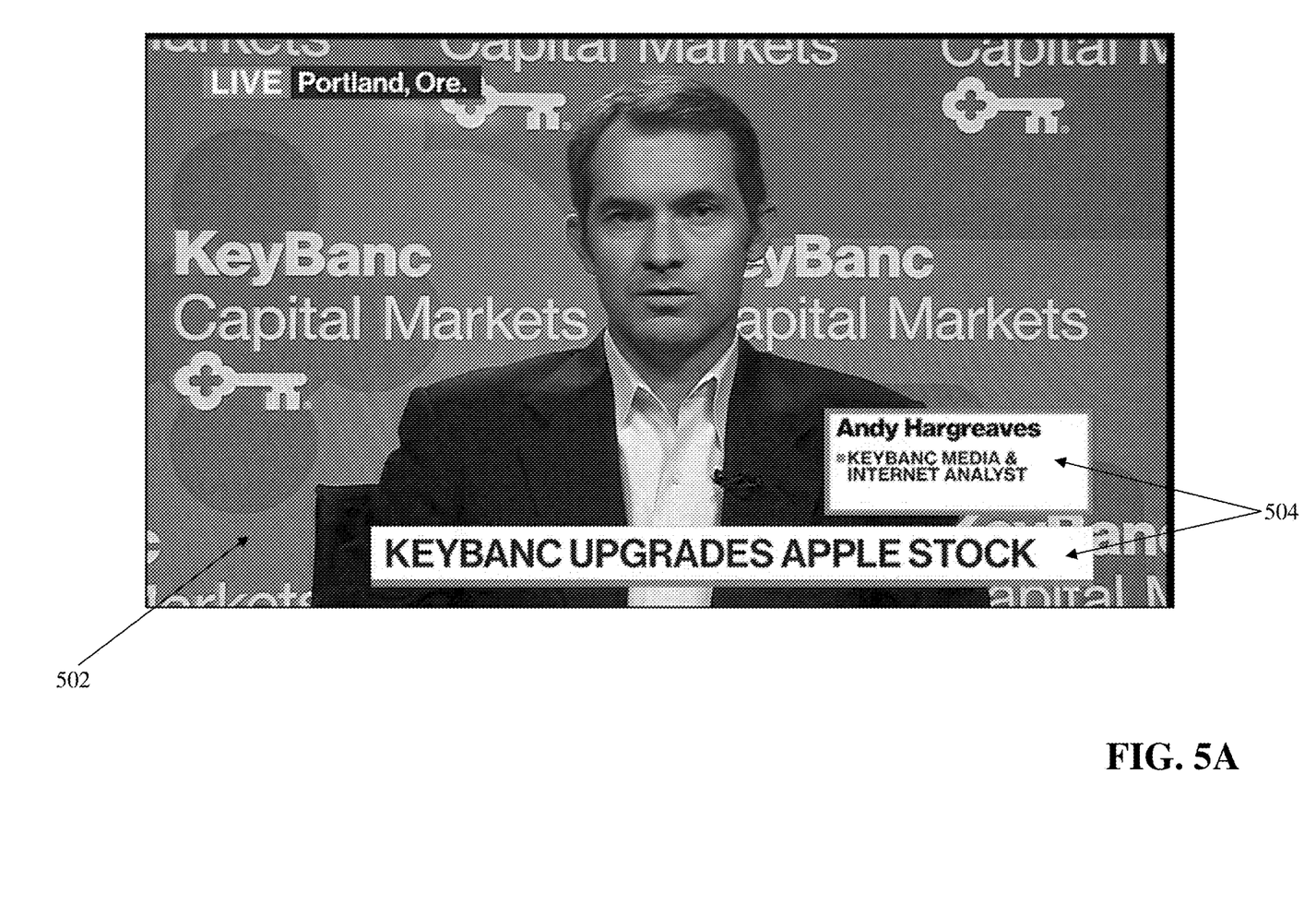
FIG. 5A is a screenshot of a first content overlay integrated into a video content stream.
Figure 5B:
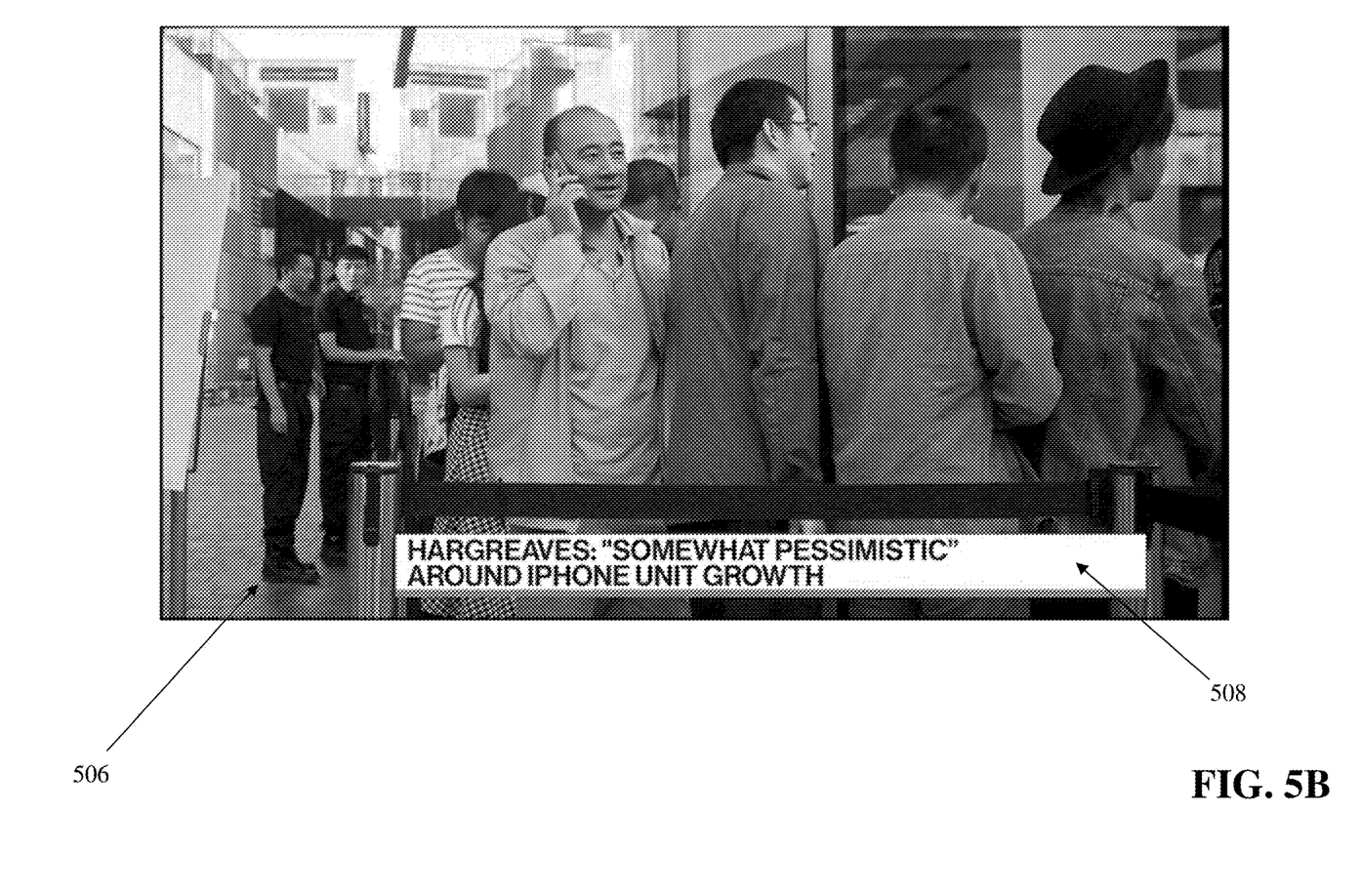
FIG. 5B is a screenshot of a second content overlay integrated into a video content stream.

In one embodiment, the video overlay module 114 receives the content overlay from the content generation module 112 and receives the video content stream from the video capture module 108. The video overlay module 114 can determine one or more frames in the video content stream in which the content overlay should be integrated. For example, if the mention of an identified entity occurred at the 2-minute mark of the video content stream (based upon the metadata associated with the video stream and the processing of the video capture module 108 and keyword identification and filtering module 110 described above), the video overlay module 114 can extract one or more frames from the video content stream at or around the 2-minute mark, integrate the content overlay with the extracted frames, then replace the extracted frames back into the video content stream at the appropriate locations. In some embodiments, the video overlay module 114 can remove certain redundant frames from the video content stream and replace them with content overlay frames. In some examples, the video overlay module 114 can determine which video frames to remove based on considerations such as, for example, impact to the overall video quality, continuity of the video content, buffering capacity, or other similar considerations. In other examples, the video content stream may have pre-assigned frames that can be extracted or 'empty' frames in which the module 114 can insert the content overlay data. It should be appreciated that other techniques for integrating the content overlay into the video content stream can be used within the scope of invention FIG. 5A and FIG. 5B are screenshots of content overlays placed into a video content stream. As shown in FIG. 5A, the video content stream 502 depicts a Keybanc analyst that is speaking about his firm's upgrading of Apple stock. The video capture module 108 of server computing device 106 captures the video content stream and extracts the corresponding audio stream to create the corpus of machine-recognizable text that corresponds to the analyst's speech, as described above. The keyword identification and filtering module 110 identifies the 'Apple' entity name and the 'Keybanc' entity name in the corpus of text and determines a set of content keywords associated with the identified entity names. In this instance, because the analyst is at a known entity (Keybanc) talking about upgrading a known stock (Apple), the module 110 can use the corpus of machine-recognizable text to identify the entities and determine content keywords relating to these entities, such as Apple ticker symbol, the analyst's name, and so forth. Based upon these content keywords, the content generation module 112 can retrieve content items associated with the keywords—such as Apple's current stock price, the analyst's title, news headlines about Apple and/or Keybanc, and the like. The content generation module 112 can generate the content overlay (e.g., comprising text areas 504 in FIG. 5A that identify the speaker and provide information about the topic of discussion) as a layer to be presented on top of the video content stream in the lower right corner. The video overlay module 114 integrates the content overlay into the underlying video content stream, and transmits the customized video content stream to the client computing device for display to the user.

As shown in FIG. 5B, the video content stream 502 depicts a news report where a reporter is speaking about a new Apple iPhone™ on sale, and people are shown waiting in line to purchase the new device. The video capture module 108 of server computing device 106 captures the video content stream and extracts the corresponding audio stream to create the corpus of machine-recognizable text that corresponds to the reporter's speech, as described above. The keyword identification and filtering module 110 identifies the 'Apple' entity name and the 'iPhone' product name in the corpus of text and determines a set of content keywords associated with the identified entity names. In this instance, the module 110 can use the corpus of machine-recognizable text to identify the entities and determine content keywords relating to these entities, such as Apple ticker symbol, iPhone™ sales numbers, and so forth. In addition, because the system 100 previously captured keywords and content associated with the Keybanc analyst's discussion of Apple stock as described previously, the system 100 can use these content keywords as well to generate content overlays for this subsequent video content stream. As such, based upon these content keywords, the content generation module 112 can retrieve content items associated with the keywords—such as Apple's current stock price, the analyst's outlook on the iPhone®, news headlines about Apple, and the like. The content generation module 112 can generate the content overlay (e.g., comprising text areas 508 in FIG. 5B that identify the speaker and provide information about the topic of discussion) as a layer to be presented on top of the video content stream in the lower right corner. The video overlay module 114 integrates the content overlay into the underlying video content stream, and transmits the customized video content stream to the client computing device for display to the user.

Thus, the intelligent integrated content overlay systems and methods as described herein advantageously enable the automatic conversion of entity 'mentions' in broadcasts or recorded videos to be extracted and transformed for the purpose of producing content overlays for video content streams in real-time that include supplemental information pertinent to the 'mentions'. In some embodiments, the transformation of sequential or semantically revealing mentions, such as comparisons, can produce more elaborate content overlays, such as comparison charts or side-by-side comparisons. In some embodiments, the transformation leverages a knowledge base to perform proactive comparison and overlay market data or relevant facts for company related entities, including but not limited to sectors, known competitors or competing products. In some embodiments, the transformation of mentions produces educational content for video overlay. Examples of educational overlays include definitions of financial terms like earnings per share (EPS). In some embodiments, the transformation of mentions is conditional based on context, such as the nature of the mention or the time of year. For example, when a video program covers quarterly product sales forecasting, the resulting overlay can include relevant information such as product market share or historic product information. For example, during or in advance of an earnings season, the overlay can include historic company earnings or upcoming company earnings announcements. In some embodiments, context collected from an individual device represents a mention. For example, if a user utilizes a virtual reality (VR) device, images of real-life can be used to extract company or product logos, resulting in a related video overlay.

In some embodiments, the systems and methods described herein detect that a user shows interest in specific video content based on his interaction with certain content overlays. The systems and methods can use the detected interactions to influence the generation of future content overlays of supplemental information, produce suggested content, or suggest other features exposed by the content overlays. For example, a user's repeated interaction with content overlays that provide information about a given company can result in the system offering future proactive comparisons as other companies in the same sector are discussed, such as providing an overlay showing what related video content is available, an overlay offering a review of personal holdings related to the company, or an overlay offering to add the company to the user's personal watch list.

Method steps can be performed by one or more special-purpose processors executing a computer program to perform functions of the invention by operating on input data and/or generating output data. Method steps can also be performed by, and an apparatus can be implemented as, special-purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special-purpose microprocessors. Generally, a processor receives instructions and data from a read-only memory or a random access memory or both. The essential elements of a computer are a specialized processor for executing instructions and one or more specifically-allocated memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A system for generating integrated intelligent content overlays for media content streams, the system comprising a server computing device with a memory that stores computer-executable instructions and a processor that executes the computer-executable instructions to:
   receive a video content stream from a video data source;
   extract a corpus of machine-recognizable text from the video content stream, the corpus of machine-recognizable text corresponding to at least one of audio or closed captioning text associated with the video content stream;
   identify one or more entity names contained in the corpus of machine-recognizable text, including:
      tokenizing the corpus of machine-recognizable text into a plurality of text fragments,
      tagging each token with an identifier relating to a part of speech associated with the token,
      selecting one or more of the tokens that are tagged with an identifier where the part of speech is a noun, and
      matching the selected tokens against a database of preselected entity names to identify tokens that correspond to entity names;
   determine a set of content keywords associated with each of the identified entity names, including determining at least a portion of the set of content keywords by mapping one or more of the entity names to a set of keywords in a mapping table;
   generate a content overlay for the video content stream comprising one or more layers that include graphical content relating to at least one of the sets of content keywords; and
   integrate the content overlay into the video content stream to generate a customized video content stream.

2. The system of claim 1, wherein the server computing device:
   receives a request for the video content stream from a client computing device;
   identifies a user of the client computing device based upon one or more attributes of the request;
   retrieves a user profile based upon an identity of the user, the user profile comprising one or more user attributes; and
   adjusts the graphical content included in the layers of the content overlay based upon the user profile.

3. The system of claim 1, wherein extracting a corpus of machine-recognizable text from the video content stream comprises:
   capturing an audio stream associated with the video content stream, the audio stream comprising a digital waveform corresponding to speech in the video content stream; and
   converting the digital waveform of the audio stream into the corpus of machine-recognizable text.

4. The system of claim 1, wherein extracting a corpus of machine-recognizable text from the video content stream comprises:
   capturing a closed-captioning stream associated with the video content stream, the closed-captioning stream comprising text corresponding to speech in the video content stream; and
   converting the text of the closed-captioning stream into the corpus of machine-recognizable text.

5. The system of claim 1, wherein determining a set of content keywords associated with each of the identified entity names comprises executing a trained word embedding model using as input the identified entity names, the trained word embedding model comprising a multidimensional vector space, to determine one or more content keywords that are within a predetermined distance of the identified entity name within the multidimensional vector space.

6. The system of claim 1, wherein determining a set of content keywords associated with each of the identified entity names comprises:
   executing a trained long short-term memory (LSTM) model using as input one or more sentences from the corpus of machine-recognizable text that contain the entity names to predict whether the one or more sentences relate to the identified entity names; and
   generating one or more content keywords using the one or more sentences, when the one or more sentences are predicted to relate to the identified entity names.

7. The system of claim 1, wherein generating a content overlay for the video content stream comprises generating one or more video frames containing the one or more layers.

8. The system of claim 7, wherein integrating the content overlay into the video content stream to generate a customized video content stream comprises inserting the one or more video frames containing the one or more layers into the video content stream to replace one or more existing video frames in the video content stream.

9. The system of claim 1, wherein extracting a corpus of machine-recognizable text from the video content stream further comprises mapping the corpus of machine-recognizable text to the video content stream based upon a timestamp.

10. The system of claim 9, wherein generating a content overlay for the video content stream further comprises synchronizing the content overlay to the video stream based upon the timestamp.

11. The system of claim 1, wherein the server computing device transmits the customized video content stream to a client computing device for display.

12. The system of claim 11, wherein the transmission of the customized video content stream to the client computing device is a streaming session.

13. The system of claim 1, wherein the video content stream comprises a live video stream or a prerecorded video file.

14. A computerized method of generating integrated intelligent content overlays for media content streams, the method comprising:
   receiving, by a server computing device, a video content stream from a video data source;
   extracting, by the server computing device, a corpus of machine-recognizable text from the video content stream, the corpus of machine-recognizable text corresponding to at least one of audio or closed captioning text associated with the video content stream;
   identifying, by the server computing device, one or more entity names contained in the corpus of machine-recognizable text, including:
      tokenizing the corpus of machine-recognizable text into a plurality of text fragments,
      tagging each token with an identifier relating to a part of speech associated with the token,
      selecting one or more of the tokens that are tagged with an identifier where the part of speech is a noun, and
      matching the selected tokens against a database of preselected entity names to identify tokens that correspond to entity names;
   determining, by the server computing device, a set of content keywords associated with each of the identified entity names, including determining at least a portion of the set of content keywords by mapping one or more of the entity names to a set of keywords in a mapping table;
   generating, by the server computing device, a content overlay for the video content stream comprising one or more layers that include graphical content relating to at least one of the sets of content keywords; and
   integrating, by the server computing device, the content overlay into the video content stream to generate a customized video content stream.

15. The method of claim 14, further comprising:
   receiving, by the server computing device, a request for the video content stream from a client computing device;
   identifying, by the server computing device, a user of the client computing device based upon one or more attributes of the request;
   retrieving, by the server computing device, a user profile based upon an identity of the user, the user profile comprising one or more user attributes; and
   adjusting, by the server computing device, the graphical content included in the layers of the content overlay based upon the user profile.

16. The method of claim 14, wherein extracting a corpus of machine-recognizable text from the video content stream comprises:
   capturing, by the server computing device, an audio stream associated with the video content stream, the audio stream comprising a digital waveform corresponding to speech in the video content stream; and
   converting, by the server computing device, the digital waveform of the audio stream into the corpus of machine-recognizable text.

17. The method of claim 14, wherein extracting a corpus of machine-recognizable text from the video content stream comprises:
   capturing, by the server computing device, a closed-captioning stream associated with the video content stream, the closed-captioning stream comprising text corresponding to speech in the video content stream; and
   converting, by the server computing device, the text of the closed-captioning stream into the corpus of machine-recognizable text.

18. The method of claim 14, wherein determining a set of content keywords associated with each of the identified entity names comprises executing a trained word embedding model using as input the identified entity names, the trained word embedding model comprising a multidimensional vector space, to determine one or more content keywords that are within a predetermined distance of the identified entity name within the multidimensional vector space.

19. The method of claim 14, wherein determining a set of content keywords associated with each of the identified entity names comprises:
   executing, by the server computing device, a trained long short-term memory (LSTM) model using as input one or more sentences from the corpus of machine-recognizable text that contain the entity names to predict whether the one or more sentences relate to the identified entity names; and
   generating, by the server computing device, one or more content keywords using the one or more sentences, when the one or more sentences are predicted to relate to the identified entity names.

20. The method of claim 14, wherein generating a content overlay for the video content stream comprises generating one or more video frames containing the one or more layers.

21. The method of claim 20, wherein inserting the content overlay into the video content stream to generate a customized video content stream comprises inserting the one or more video frames containing the one or more layers into the video content stream to replace one or more existing video frames in the video content stream.

22. The method of claim 14, wherein extracting a corpus of machine-recognizable text from the video content stream further comprises mapping the corpus of machine-recognizable text to the video content stream based upon a timestamp.

23. The method of claim 22, wherein generating a content overlay for the video content stream further comprises synchronizing the content overlay to the video stream based upon the timestamp.

24. The method of claim 14, wherein the server computing device transmits the customized video content stream to a client computing device for display.

25. The method of claim 24, wherein the transmission of the customized video content stream to the client computing device is a streaming session.

26. The method of claim 14, wherein the video content stream comprises a live video stream or a prerecorded video file.

\* \* \* \* \*